United States Patent
Onaka et al.

(10) Patent No.: US 7,453,628 B2
(45) Date of Patent: Nov. 18, 2008

(54) OPTICAL AMPLIFIER HAVING WIDE DYNAMIC RANGE

(75) Inventors: Miki Onaka, Kawasaki (JP); Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/322,558

(22) Filed: Jan. 3, 2006

(65) Prior Publication Data
US 2007/0047067 A1   Mar. 1, 2007

(30) Foreign Application Priority Data
Aug. 31, 2005   (JP)   ............... 2005-252508

(51) Int. Cl.
*H04B 10/17*   (2006.01)
*H04B 10/12*   (2006.01)
(52) U.S. Cl. .............. 359/341.42; 359/341.4; 359/341.42
(58) Field of Classification Search . 359/341.4–341.42, 359/341.41
See application file for complete search history.

(56) References Cited

U.S. PATENT DOCUMENTS

| | | | | |
|---|---|---|---|---|
| 5,280,383 | A | * | 1/1994 | Federici et al. ........ 359/341.33 |
| 5,995,274 | A | * | 11/1999 | Sugaya et al. ............ 359/337 |
| 6,055,092 | A | | 4/2000 | Sugaya et al. |
| 6,057,959 | A | * | 5/2000 | Taylor et al. ........... 359/337.13 |
| 6,865,016 | B2 | * | 3/2005 | Sugaya et al. ........... 359/337.1 |
| 2003/0021009 | A1 | * | 1/2003 | MacCormack et al. ..... 359/337 |
| 2004/0197105 | A1 | * | 10/2004 | Khatana et al. ............ 398/173 |

FOREIGN PATENT DOCUMENTS

| | | | |
|---|---|---|---|
| EP | 805571 A2 | * | 11/1997 |
| JP | 10-65650 | | 3/1998 |
| JP | 2000201111 A | * | 7/2000 |
| JP | 2004072062 A | * | 3/2004 |
| JP | 3551418 | | 5/2004 |

OTHER PUBLICATIONS

Laurence Lolivier et al., *OFC Technical Digest*, "DGE-based Variable Gain EDFA Improves Both Gain Flatness and Noise Figure for a 70° C. Temperature Operating Range," (Mar. 10, 2005).

* cited by examiner

*Primary Examiner*—Eric Bolda
(74) *Attorney, Agent, or Firm*—Hanify & King LLP

(57) ABSTRACT

In an optical amplifier of the invention, a first variable optical attenuator is provided between a fore-stage optical amplification unit and a post-stage optical amplification unit, and a second variable optical attenuator is also provided on the output side of the post-stage optical amplification unit. When a signal light input level of a WDM light inputted to an input port is lower than a base point level, an attenuation amount of the first variable optical attenuator is not increased (basically minimized), and the control which increases the attenuation amount of the second variable optical attenuator is performed corresponding to the increase in signal light input level. On the other hand, when the signal light input level is higher than the base point level, the attenuation amounts of both the first variable optical attenuator and the second variable optical attenuator are controlled according to the signal light input level. Accordingly, a low-cost WDM optical amplifier having a wide input dynamic range, in which a predetermined signal light output level and flatness of output wavelength characteristics can be kept by the simple control with respect to a fluctuation in signal light input level, can be provided.

8 Claims, 7 Drawing Sheets

RELATED ART

FIG.14

RELATED ART

OPTICAL AMPLIFIER HAVING WIDE DYNAMIC RANGE

BACKGROUND OF THE INVENTION

1. Field of the Invention

The present invention relates to an optical amplifier used for an optical transmission system, which transmits a wavelength division multiplexing (WDM) light, particularly to the optical amplifier having a wide input dynamic range.

2. Related Art

In the optical amplifier (hereinafter referred to as WDM optical amplifier) used for the WDM optical transmission system in which signal lights having the different wavelengths are multiplexed to perform the communication, rare-earth doped fiber optical amplifier becomes mainly commercially practical because of low noise figure (NF), high output, and high reliability.

Figure 13:
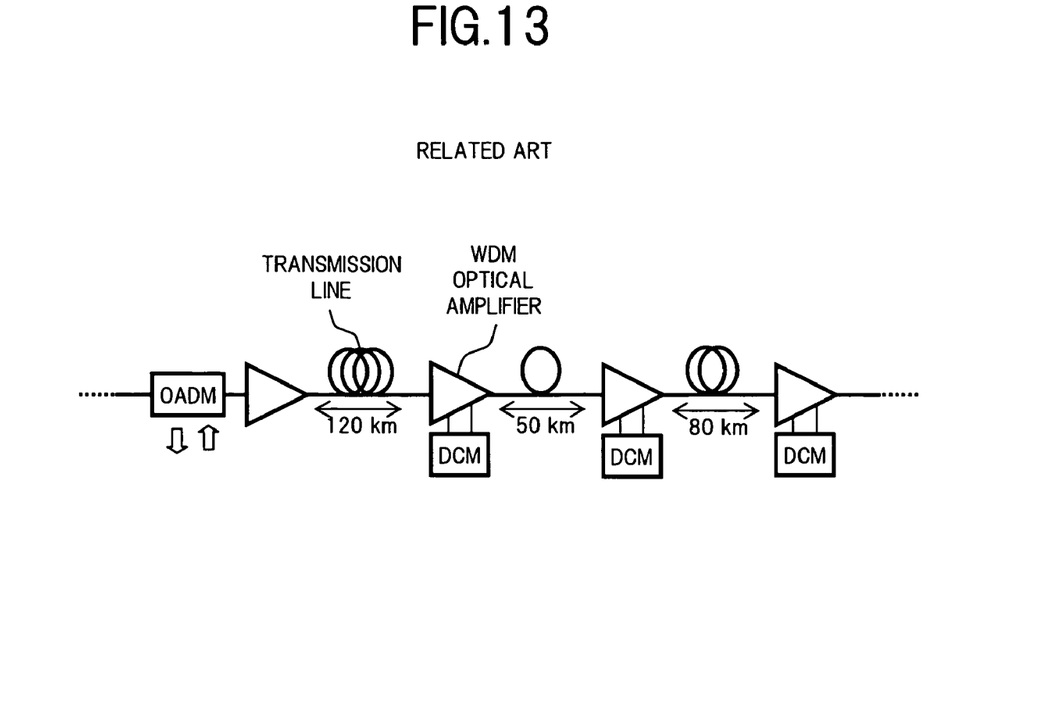
FIG. 13 is a view showing a configuration example of a general WDM optical transmission system.

As shown in a system configuration of FIG. 13, a signal light input level per one wavelength of the WDM optical amplifier fluctuates depending on a length of transmission line provided on an input side and a loss difference per unit length of the transmission line, or a temperature characteristic or aged degradation of insertion loss of various optical components arrange on the transmission line.

Therefore, a function that even if an inputted signal light level fluctuates a predetermined output level and output wavelength flatness are kept is very important for the WDM optical amplifier, and a technology for realizing the function is necessary to the construction of the WDM optical transmission system. This is because the difference in signal light power becomes factors (for example, non-linear characteristics of the WDM light and S/N degradation) limiting a transmission distance of the WDM light. It is also important that the function is realized by the single WDM optical amplifier having wider input dynamic range. When the single WDM optical amplifier having wider input dynamic range is realized, the number of total menus (kinds) of the optical amplifier can be reduced in the WDM optical transmission system, which results in simplification of menu management/operation of the optical amplifier and the reduction in inventory number of the optical amplifier. Therefore, the WDM optical transmission system can efficiently be constructed.

Conventionally, in order to realize the characteristics required for the WDM optical amplifier, there is known the technology, in which a variable optical attenuator (VOA) which seemingly contradicts amplification is arranged between a fore-stage amplification unit and a post-stage amplification unit and output level deviation is reduced among signal lights of the wavelengths included in the WDM light while the signal light output level is kept constant with respect to the fluctuation in signal light input level, and this technology becomes a standard configuration of the optical amplifier in the WDM optical transmission system (for example, see Japanese Patent No. 3551418).

There is also reported a technology, in which a variable gain equalizer (VGEQ) is arranged between the fore-stage amplification unit and the post-stage amplification unit and a change in output wavelength characteristic generated by the fluctuation in signal light input level is compensated by adding the loss to each wavelength of the WDM light (for example, see Laurence Lolivier et al., "DGE-Based Variable Gain EDFA Improves Both Gain Flatness and Noise Figure for a 70° C. Temperature Operating Range", OFC/NFOEC 2005 Conference, OThL4).

However, when the WDM optical amplifier (hereinafter, abbreviated to as inter-stage VOA) in which the variable optical attenuator is arranged between the stages of the amplification units and the WDM optical amplifier (hereinafter, abbreviated to as inter-stage VGEQ) in which the variable gain equalizer is arranged between the stages of the amplification units are compared to each other, both the inter-stage VOA and the inter-stage VGEQ have advantages and disadvantages with respect to a control method, the noise figure (NF), and device cost.

Specifically, for the control method, the control method applied to the inter-stage VOA is as follows: A gain is kept constant by monitoring total power of the inputted and outputted WDM light, and an optical attenuation amount of the variable optical attenuator provided between the stages is changed according to the fluctuation in signal light input level, which holds the predetermines signal light output level which the flatness of the output wavelength characteristic is maintained. On the other hand, the control method in which the insertion loss of the variable gain equalizer for the signal light having each wavelength is changed such that the output wavelength characteristic becomes flat is applied to the inter-stage VGEQ. By comparison, while the control method of the inter-stage VOA is relatively simple because at least the gain (output-input) is controlled by monitoring the input and output in the total power of the WDM light, the control method of the inter-stage VGEQ becomes complicated because it is necessary that the insertion loss is separately controlled in each wavelength range according to the signal light having each wavelength.

Figure 14:
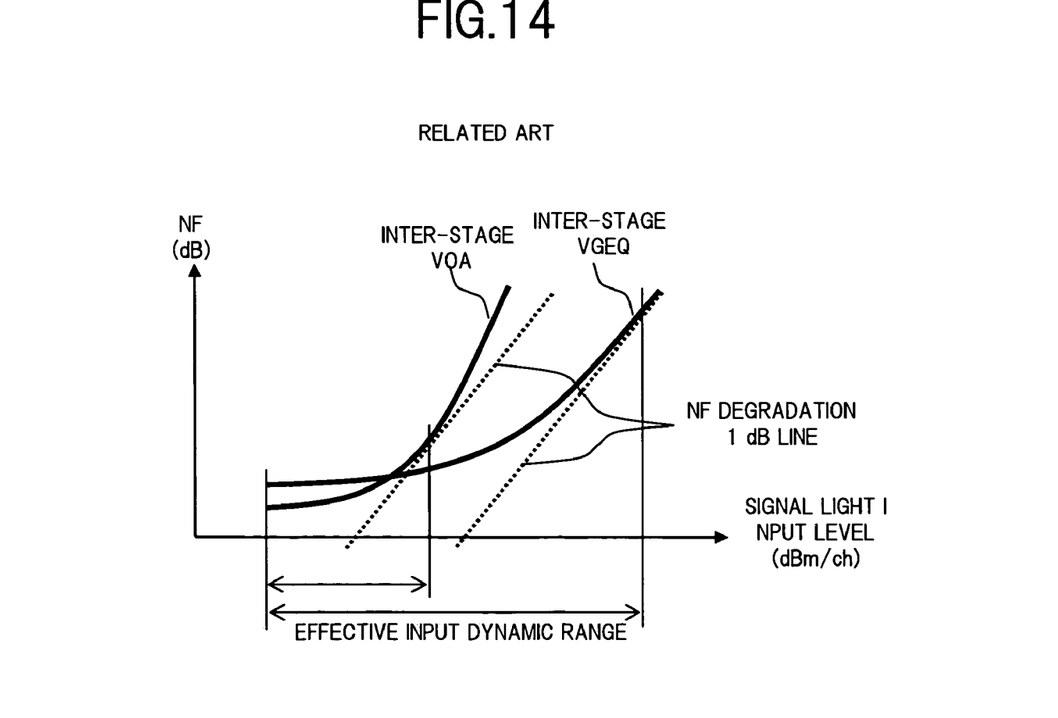
FIG. 14 is a view showing the NF change to the signal light input level in the conventional WDM optical amplifier.

For NF, as shown in FIG. 14, because the control in which the attenuation amount of the variable optical attenuator is increased as the signal light input level is increased in the inter-stage VOA, NF is steeply degraded in a region where the signal light input level is high. On the other hand, in the inter-stage VGEQ, because the change in insertion loss of the variable gain equalizer becomes small for the increase in signal light input level when compared with the inter-stage VOA, the NF degradation is small in the region where the signal light input level is high. When a range where the NF degradation is lower than 1 dB for the increase in signal light input level by 1 dB is considered, as shown in FIG. 14, a position at which an NF curved line represented by a solid line and an NF degradation 1 dB line come into contact with each other becomes a maximum value of the signal light input level, so that the inter-stage VGEQ can realize the wider input dynamic range when compared with the inter-stage VOA.

In the inter-stage VGEQ, because the insertion loss value of the variable gain equalizer is large (for example, 8 dB), NF is largely degraded in the region where the signal light input level is low when compared with the inter-stage VOA.

For the device cost, while the variable optical attenuator is inexpensive, the variable gain equalizer is expensive (for example, about 30 times).

In consideration of the above features of the related art, it is desirable to establish the new technology in which the ease of control and low cost which are the advantages of the inter-stage VOA and the wider effective input dynamic range which is the advantage of the inter-stage VGEQ are simultaneously realized.

SUMMARY OF THE INVENTION

In view of the foregoing, an object of the invention is to provide a low-cost WDM optical amplifier having a wide input dynamic range, in which a predetermined signal light output level and flatness of output wavelength characteristics can be kept by the simple control with respect to a fluctuation in signal light input level.

In order to achieve the above object, an optical amplifier of the invention including an input port and an output port; a first optical amplification unit which amplifies a wavelength division multiplexing light inputted to the input port; a first optical attenuation unit which attenuates the wavelength division multiplexing light amplified by the first optical amplification unit; a second optical amplification unit which amplifies the wavelength division multiplexing light attenuated by the first optical attenuation unit, and outputs the wavelength division multiplexing light to the output port; an input monitor unit which detects power of the wavelength division multiplexing light inputted to the input port; an output monitor unit which detects the power of the wavelength division multiplexing light outputted from the output port; and a control unit which controls the first and second optical amplification units based on the detection results of the input monitor unit and the output monitor unit such that a gain is kept constant, and controls an attenuation amount of the first optical attenuation unit such that the signal light level per one wavelength outputted from the output port is kept constant, even if the signal light level per one wavelength of the wavelength division multiplexing light inputted to the input port is changed. Further the optical amplifier includes a second optical attenuation unit which is provided between the second optical amplification unit and the output port, and, when a signal light input level per one wavelength computed based on the detection result of the input monitor unit is lower than a predetermined first base point level, the control unit minimizes the attenuation amount of the first optical attenuation unit and the control unit controls the attenuation amount of the second optical attenuation unit according to the signal light input level, when the signal light input level is higher than the first base point level, the control unit controls the attenuation amounts of both the first and second optical attenuation units according to the signal light input level.

In the optical amplifier according to the invention, in addition to the configuration corresponding to the conventional inter-stage VOA in which the first optical attenuation unit is arranged between the stages of the first and second optical amplification units, the second optical attenuation unit is provided in the post stage of the second optical amplification unit. When the signal light input level per one wavelength of the WDM light inputted to the input port is lower than the predetermined first base point level, after the WDM light inputted to the input port is amplified by the first optical amplification unit to which the gain constant control is performed, the WDM light passes through the first optical attenuation unit in which the attenuation amount is set at the minimum, and the WDM light is transmitted to the second optical amplification unit to which the gain constant control is performed and amplified. Then, the WDM light is attenuated by the second optical attenuation unit in which the attenuation amount is controlled according to the signal light input level, and the WDM light in which the signal light output level is kept constant is outputted from the output port. On the other hand, when the signal light input level is higher than the first base point level, the WDM light is amplified by the first optical amplification unit is attenuated by the first optical attenuation unit in which the attenuation amount is controlled according to the signal light input level, and the WDM light amplified by the second optical amplification unit is attenuated by the second optical attenuation unit in which the attenuation amount is controlled according to the signal light input level.

According to the above-described WDM optical amplifier of the invention, the gain constant control of the first and second optical amplification units and the attenuation amount control of the first second optical attenuation units are performed based on the WDM light power detected by the input monitor unit and the output monitor unit, so that the predetermined signal light output level and the flatness of the output wavelength characteristics can be kept by the simple control method. When the required attenuation amount of the first optical attenuation unit is reduced by the application of the second optical attenuation unit, NF degradation is suppressed in the region where the signal light input level is high, the enlargement of the effective input dynamic range can be achieved. Further, since the inexpensive variable optical attenuator can be used as the first and second optical attenuation units, the low-cost optical amplifier can be provided. When the WDM optical transmission system is formed by the WDM optical amplifier of the invention, because the single WDM optical amplifier can deal with the signal light input level in the wide range, the menu management/operation of the optical amplifier can be simplified and the reduction in inventory number of the optical amplifier can be achieved.

Other objects, features, and advantages of the invention will be clarified from the following descriptions of the embodiments with reference to the accompanying drawings.

DETAILED DESCRIPTION OF THE INVENTION

Preferred embodiments of the invention will be described below with reference to the accompanying drawings. In all the drawings, the same reference numeral shall designate the same or corresponding component.

Figure 1:
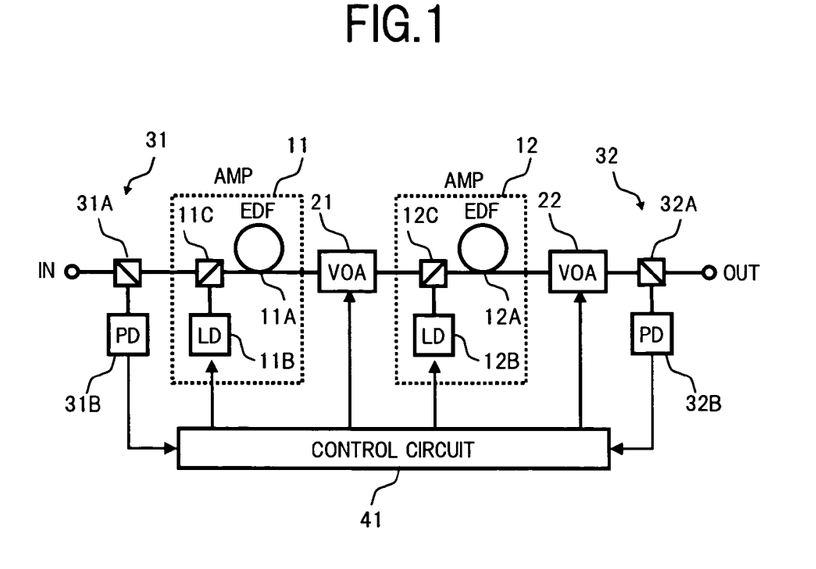
FIG. 1 is a block diagram showing a configuration of a WDM optical amplifier according to a first embodiment of the invention.

FIG. 1 is a block diagram showing a configuration of a WDM optical amplifier according to a first embodiment of the invention.

Referring to FIG. 1, the WDM optical amplifier of the first embodiment includes an optical amplification unit (AMP) 11, an optical amplification unit 12, a variable optical attenuator (VOA) 21, a variable optical attenuator 22, an input monitor unit 31, an output monitor unit 32, and a control circuit 41. The optical amplification unit 11, which is of the first optical amplification unit, and the optical amplification unit 12 which is of the second optical amplification unit are arranged in series between an input port IN and an output port OUT. The variable optical attenuator (VOA) 21, which is of the first variable optical attenuation unit, is connected between stages of the optical amplification units 11 and 12. The variable optical attenuator 22, which is of the second variable optical attenuation unit, is connected to a post-stage of the optical amplification unit 12. The input monitor unit 31 is connected between the input port IN and the optical amplification unit 11. The output monitor unit 32 is connected between the variable optical attenuator 22 and the output port OUT. The control circuit 41, which is of the control unit, controls the optical amplification units 11 and 12 and the variable optical attenuators 21 and 22.

The optical amplification units 11 and 12 are a general erbium-doped fiber amplifier (EDFA) in which the WDM lights are collectively amplified by supplying pumping lights outputted from pumping light sources (LD) 11B and 12B to erbium-doped fibers (EDF) 11A and 12A which are of an optical amplification medium through multiplexers 11C and 12C. The optical amplification units 11 and 12 are automatically controlled by controlling the pumping light sources 11B and 12B according to signals from the control circuit 41 respectively such that the gain is kept constant even if the signal light input level fluctuates In this case, EDFA is used as the optical amplification units 11 and 12. However, in the invention, any well-known optical amplifier, which can collectively amplify the WDM light, can be applied to the optical amplification units 11 and 12.

The variable optical attenuators 21 and 22 are a well-known optical device which can change an attenuation amount according to a control signal supplied from the outside. In this case, as described later, the attenuation amount of the variable optical attenuators 21 and 22 are controlled according to the control signal supplied from the control circuit 41 respectively.

For example, the input monitor unit 31 includes an optical branching coupler 31A and a photodetector (PD) 31B. The optical branching coupler 31A braches the WDM light inputted to the input port IN and transmits a part of the WDM light to the photodetector 31B. The photodetector 31B detects power by receiving the branch light from the optical branching coupler 31A, and the photodetector 31B outputs the signal indicating the detection result to the control circuit 41.

For example, the output monitor unit 32 includes an optical branching coupler 32A and a photodetector 32B. The optical branching coupler 32A branches the WDM light outputted from the variable optical attenuator 22 and transmits a part of the WDM light to the photodetector 32B. The photodetector 32B detects power by receiving the branch light from the optical branching coupler 32A, and the photodetector 32B outputs the signal indicating the detection result to the control circuit 41.

The control circuit 41 computes a gain of the optical amplifier based on the output signals from the input monitor unit 31 and the output monitor unit 32, and the control circuit 41 automatically controls pumping light powers of the optical amplification units 11 and 12 (Automatic Gain Control: AGC) such that the gain is kept constant irrespective of the fluctuation in signal light input level. The control circuit 41 obtains information (the number of signal wavelengths, ASE power, and the like) on the WDM light inputted to the input port IN from an optical supervisory channel and the like, and the control circuit 41 computes a signal light input level Pin (dBm/ch) per one wavelength of the WDM light based on the output signal from the input monitor unit 31. The control circuit 41 determines attenuation amounts of the variable optical attenuators 21 and 22 according to the signal light input level Pin, and the control circuit 41 outputs the signal for controlling each of the variable optical attenuators 21 and 22.

Then, the control of the variable optical attenuators 21 and 22 performed by the control circuit 41 according to the signal light input level will be described in detail.

With reference to the signal light input level per one wavelength of the WDM light inputted to the WDM optical amplifier, an effective input dynamic range shall be determined according to a range where the NF degradation is lower than 1 dB for the increase in signal light input level by 1 dB. A lower limit level of the effective input dynamic range is set at Pin_min, and an upper limit level is set at Pin_max. A level, which becomes a base point, is set at Pin_A (first base point level) when each of the variable optical attenuators 21 and 22 is controlled in a step manner according to the signal light input level. The base point level Pin_A is preferably set higher than the lower limit level Pin_min. Further, the base point level Pin_A is preferably set at an intermediate level of the input dynamic range, namely, the base point level Pin_A is preferably set at a level lower than Pin_min+(Pin_max−Pin_min)/2. This is because, when the base point level Pin_A is set at an excessively high level, the required attenuation amount of the variable optical attenuator 22 is increased, and the required pumping light of the optical amplification unit 11 is remarkably increased, or the input level to the optical amplification unit 12 is reduced to generate a risk that degrade an optical SN ratio. Then, control sequences of the variable optical attenuators 21 and 22 according to the signal light input level will be described with reference to FIG. 2.

Figure 2:
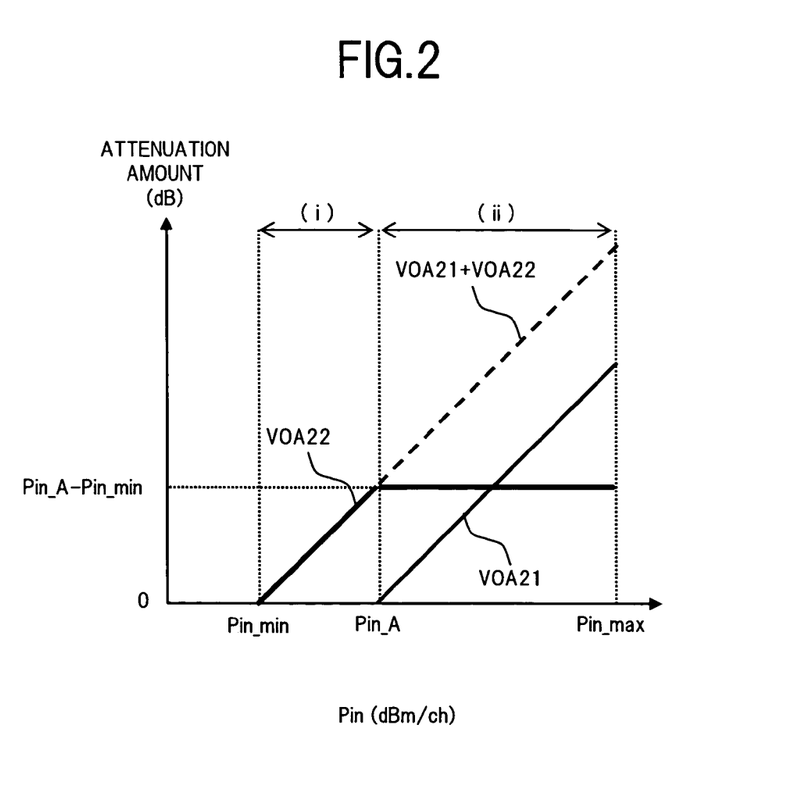
FIG. 2 is a view for explaining a control sequence of each variable optical attenuator in the first embodiment.

First the control circuit 41 computes the signal light input level Pin based on the detection result of the input monitor unit 31 and the information (signal wavelength and ASE power) obtained from the optical supervisory channel and the like. Specifically, in the computation of the signal light input level Pin, the ASE power is subtracted from a monitor value of input light total power obtained by the input monitor unit 31, and the subtracted result is divided by the number of signal wavelength to determine the signal light input level Pin. When the signal light input level Pin is computed, (Pin_A−Pin_min) is determined together.

Then, it is determined whether the signal light input level Pin is higher or lower than the base point level Pin_A. When the signal light input level Pin is lower than the base point level Pin_A, i.e., in the case of (Pin_A−Pin)>0, the control which increases the attenuation amount of the inter-stage variable optical attenuator 21 is not performed (i.e., the attenuation amount is basically the minimum (desirably zero)), and the attenuation amount of the output-side variable optical attenuator 22 is controlled to the previously determined (Pin−Pin_min) (see wide line in (i) region of FIG. 2). Therefore, the signal light power corresponding to the increase in signal light input level Pin to the lower limit level Pin_min is attenuated by the output-side variable optical attenuator 22.

On the other hand, when the signal light input level Pin is higher than the base point level Pin_A, i.e., in the case of (Pin_A−Pin)<0, the attenuation amount of the inter-stage variable optical attenuator 21 is controlled to (Pin−Pin_A) (see thin line in (ii) region of FIG. 2), and the attenuation amount of the variable optical attenuator 22 on the output side is controlled to (Pin_A−Pin_min) (see wide line in (ii) region of FIG. 2). Therefore, the signal light power corresponding to a portion exceeding the base point level Pin_A is attenuated by the inter-stage variable optical attenuator 21 in the increase in signal light input level Pin to the lower limit level Pin_min, and the signal light power corresponding to the portion between the lower limit level Pin_min and the base point level Pin_A is attenuated by the output-side variable optical attenuator 22. That is, the increase in signal light input level Pin from the lower limit level Pin_min is attenuated by combination of the inter-stage variable optical attenuator 21 and the output-side variable optical attenuator 22 (see broken line in (ii) region of FIG. 2).

Figure 3:
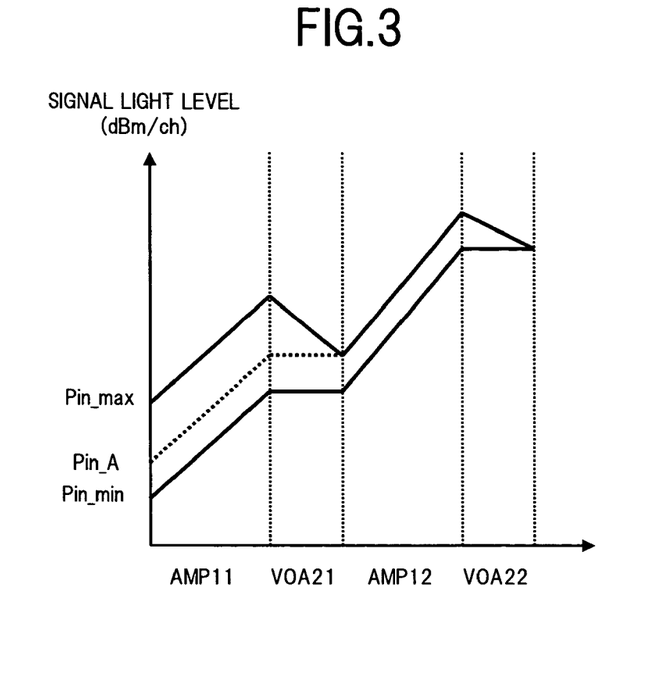
FIG. 3 is a view showing a level diagram of signal light in the first embodiment.

The attenuation amount in each of the variable optical attenuators 21 and 22 is controlled in a step manner according to the signal light input level through the above control sequence, which allows the signal light power of each wavelength to be changed, e.g., according to, a level diagram shown in FIG. 3 in the WDM light propagating through the WDM optical amplifier.

In FIG. 3, when the signal light input level Pin is lower than the base point level Pin_A, after the WDM light given to the input port IN is amplified by the fore-stage optical amplification unit 11 in which the gain is controlled to be kept constant, the WDM light passes through the inter-stage variable optical attenuator 21, and the WDM light is transmitted to the post-stage optical amplification unit 12 in which the gain is controlled to be kept constant. After the WDM light is amplified again by the post-stage optical amplification unit 12, the signal light power corresponding to the increase in signal light input level from the lower limit level (Pin −Pin_min) is attenuated by the output-side variable optical attenuator 22, and the attenuated signal light power is outputted from the output port OUT.

On the other hand, when the signal light input level Pin is higher than the base point level Pin_A, for the WDM light amplified by the fore-stage optical amplification unit 11, the signal light power corresponding to the increase in signal light input level from the base point level (Pin−Pin_A) is attenuated by the inter-stage variable optical attenuator 21. After the WDM light is amplified again by the post-stage optical amplification unit 12, the signal light power corresponding to (Pin_A−Pin_min) is attenuated by the output-side variable optical attenuator 22, and the attenuated signal light power is outputted from the output port OUT.

Figure 4:
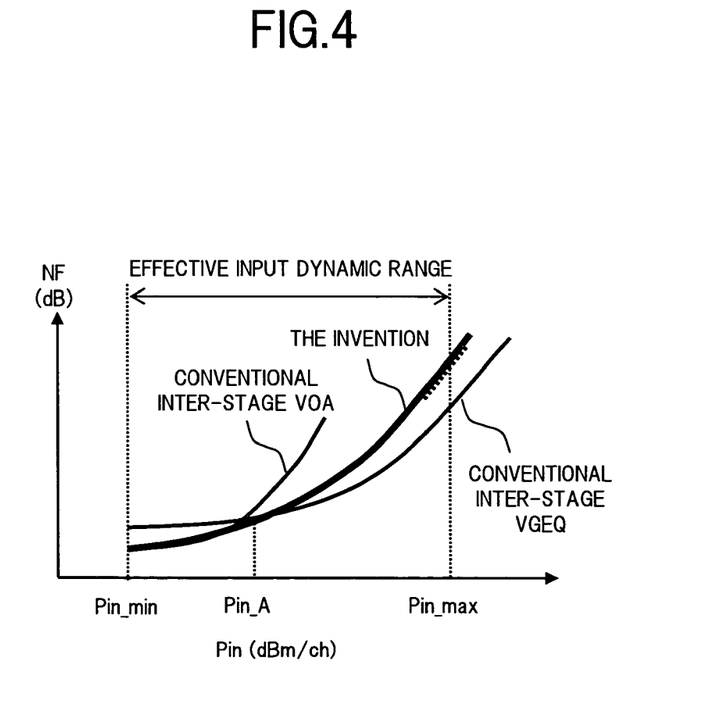
FIG. 4 is a view showing an NF change to a signal light input level in the first embodiment.

For NF of the WDM optical amplifier, for example, characteristics shown in FIG. 4 are obtained by amplifying the WDM light according to the above level diagram. As can be seen from FIG. 4, according to the WDM optical amplifier of the first embodiment, NF equal to the conventional inter-stage VOA is realized in the region where the signal light input level is low, and the steep degradation of NF is avoided unlike the conventional inter-stage VOA in the region where the signal light input level is high. Accordingly, the effective input dynamic range can be enlarged.

Thus, according to the WDM optical amplifier of the first embodiment, the predetermined signal light output level and the flatness of the output wavelength characteristics can be kept by the simple control method based on the WDM light total power which is basically similar to the conventional inter-stage VOA, and the input dynamic range wider than that of the conventional inter-stage VOA can be realized. Further, since the inexpensive VOA is used, the low-cost WDM optical amplifier can be provided. When the WDM optical transmission system is formed by the WDM optical amplifier of the first embodiment, because the single WDM optical amplifier can deal with the signal light input level in the wide range, the menu management/operation of the optical amplifier can be simplified and the reduction in inventory number of the optical amplifier can be achieved.

Then, a second embodiment of the invention will be described.

Figure 5:
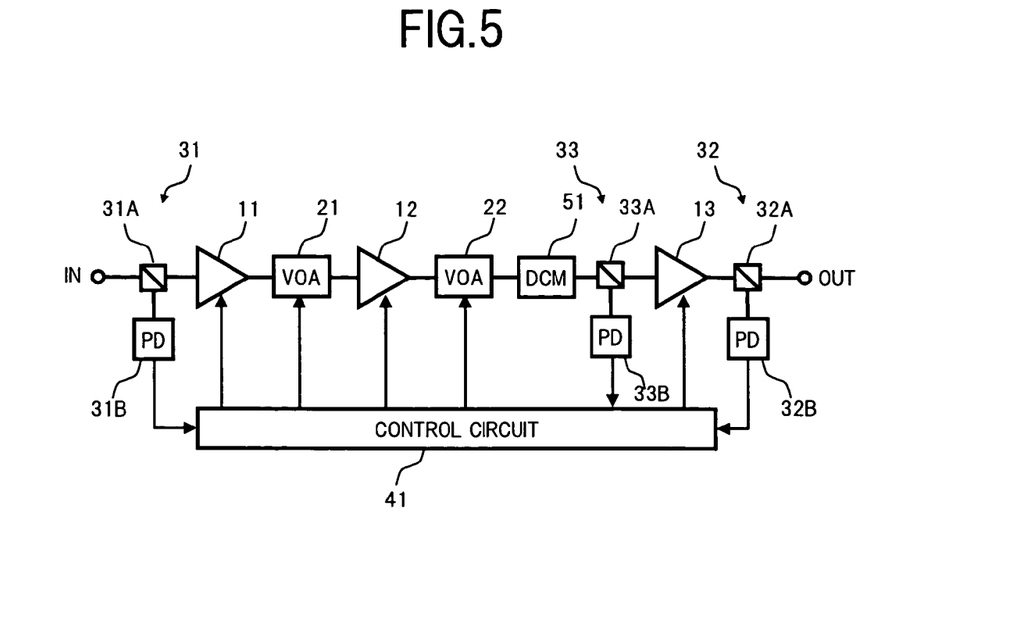
FIG. 5 is a block diagram showing a configuration of a WDM optical amplifier according to a second embodiment of the invention.

FIG. 5 is a block diagram showing a configuration of a WDM optical amplifier according to the second embodiment of the invention.

Referring to FIG. 5, in the WDM optical amplifier of the second embodiment, the chromatic dispersion compensation of the WDM light for the configuration of the first embodiment is performed inside the WDM optical amplifier. In this case, a chromatic dispersion compensator (DCM) 51, a DCM output monitor unit 33, and an optical amplification unit 13 are provided between the output-side variable optical attenuator 22 and the output monitor unit 32. The chromatic dispersion compensator 51 is the chromatic dispersion compensation unit. The DCM output monitor unit 33 monitors the total power of the WDM light outputted from the chromatic dispersion compensator 51. The optical amplification unit 13, which is of the third optical amplification unit, compensates insertion loss of the chromatic dispersion compensator 51. The configurations of other components except for the above components are similar to the first embodiment, so that the description will be omitted.

The chromatic dispersion compensator 51 is a well-known chromatic dispersion compensation device, which can compensate the chromatic dispersion accumulated in the WDM light inputted to the WDM optical amplifier. The loss generated in the chromatic dispersion compensator 51 is changed according to an amount of chromatic dispersion compensation, and usually the amount of chromatic dispersion compensation is increased as a transmission line connected to the input port IN is lengthened. In the WDM optical amplifier of the second embodiment, as described later, the fluctuation in loss of the chromatic dispersion compensator 51 is compensated by controlling the attenuation amount of the output-side variable optical attenuator 22.

The DCM output monitor unit 33 includes an optical branching coupler 33A and a photodetector 33B. The optical branching coupler 33A branches the WDM light outputted from the chromatic dispersion compensator 51, and the optical branching coupler 33A transmits a part of the WDM light to the photodetector 33B. The photodetector 33B detects the signal light power by receiving the branch light from the optical branching coupler 33A, and the photodetector 33B outputs the signal indicating the detection result to the control circuit 41.

The optical amplification unit 13 amplifies the WDM light, inputted from the chromatic dispersion compensator 51 through the optical branching coupler 33A, to a certain level and output the amplified WDM light to the output port OUT. The optical amplification unit 13 compensates the loss except for the fluctuation in loss generated in the chromatic dispersion compensator 51. Similarly to the optical amplification units 11 and 12, the control circuit 41 shall control the optical amplification unit 13 such that the gain is kept constant.

In the WDM optical amplifier of the second embodiment having the above configuration, with regard to the control sequences of the variable optical attenuators 21 and 22 of the first embodiment, the attenuation amount of the output-side variable optical attenuator 22 is set in consideration of not only the increase in signal light input level from the lower limit level but also the fluctuation in loss of the chromatic dispersion compensator 51.

Specifically, the control circuit 41 determines a signal light level Pout_DCM per one wavelength actually outputted from the chromatic dispersion compensator 51 based on the detection result of the DCM output monitor unit 33 and the information on the ASE power of the WDM light, and the control circuit 41 computes a difference (Pout_DCM−Pout_DCM_t) between the signal light level Pout_DCM and a predetermined target level Pout_DCM_t. Then, the difference (Pout_DCM−Pout_DCM_t) is added to the attenuation amount of the output-side variable optical attenuator 22 in the control sequence of the first embodiment. That is, the attenuation amount of the output-side variable optical attenuator 22 is set at {(Pin−Pin_min)+(Pout_DCM−Pout_DCM_t)} when the signal light input level Pin is lower than the base point level Pin_A, and the attenuation amount of the output-side variable optical attenuator 22 is set at {(Pin_A−Pin_min)+(Pout_DCM−Pout_DCM_t)} when the signal light input level Pin is higher than the base point level Pin_A.

Figure 6:
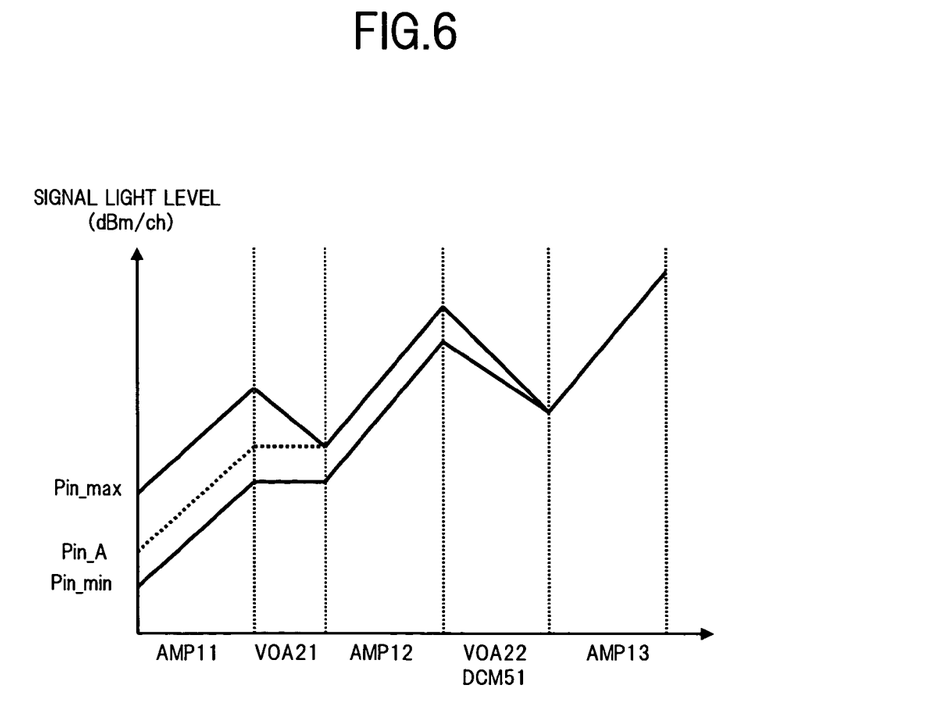
FIG. 6 is a view showing the level diagram of the signal light in the second embodiment.

In the WDM light propagating through the WDM optical amplifier in which the attenuation amount of the output-side variable optical attenuator 22 is set in the above manner, for example, the signal light power of each wavelength is changed according to the level diagram shown in FIG. 6.

In FIG. 6, when the signal light input level Pin is lower than base point level Pin_A, similarly to the first embodiment, after the WDM light given to the input port IN is amplified by the fore-stage optical amplification unit 11, the WDM light passes through the inter-stage variable optical attenuator 21, the WDM light is transmitted to the post-stage optical amplification unit 12, and the WDM light is amplified again by the post-stage optical amplification unit 12. In the WDM light outputted from the post-stage optical amplification unit 12, after the signal light power corresponding to {(Pin_A−Pin_min)+(Pout_DCM−Pout_DCM_t)} is attenuated by the output-side variable optical attenuator 22, the attenuated signal light power is given to the chromatic dispersion compensator 51 to perform the chromatic dispersion compensation of the WDM light. Accordingly, the signal light level of each wavelength outputted from the chromatic dispersion compensator 51 is kept constant irrespective of the fluctuation in loss in the chromatic dispersion compensator 51. Then, the WDM light is transmitted to the optical amplification unit 13, the WDM light is amplified to the required level, and the WDM light is outputted from the output port OUT.

On the other hand, when the signal light input level Pin is higher than the base point level Pin_A, for the WDM light amplified by the fore-stage optical amplification unit 11, the signal light power corresponding to the increase in signal light input level from the base point level (Pin−Pin_A) is attenuated by the inter-stage variable optical attenuator 21. After the WDM light is amplified again by the post-stage optical amplification unit 12, the signal light power corresponding to {(Pin_A−Pin_min)+(Pout_DCM−Pout_DCM_t)} is attenuated by the output-side variable optical attenuator 22. Therefore, similarly the signal light level of each wavelength outputted from the chromatic dispersion compensator 51 is kept constant. Then, the WDM light amplified to the required level by the optical amplification unit 13 is outputted from the output port OUT.

Thus, according to the WDM optical amplifier of the second embodiment, in addition to the effect of the above-mentioned first embodiment, the chromatic dispersion compensation of the WDM light can be performed in the wide input dynamic range.

Figure 7:
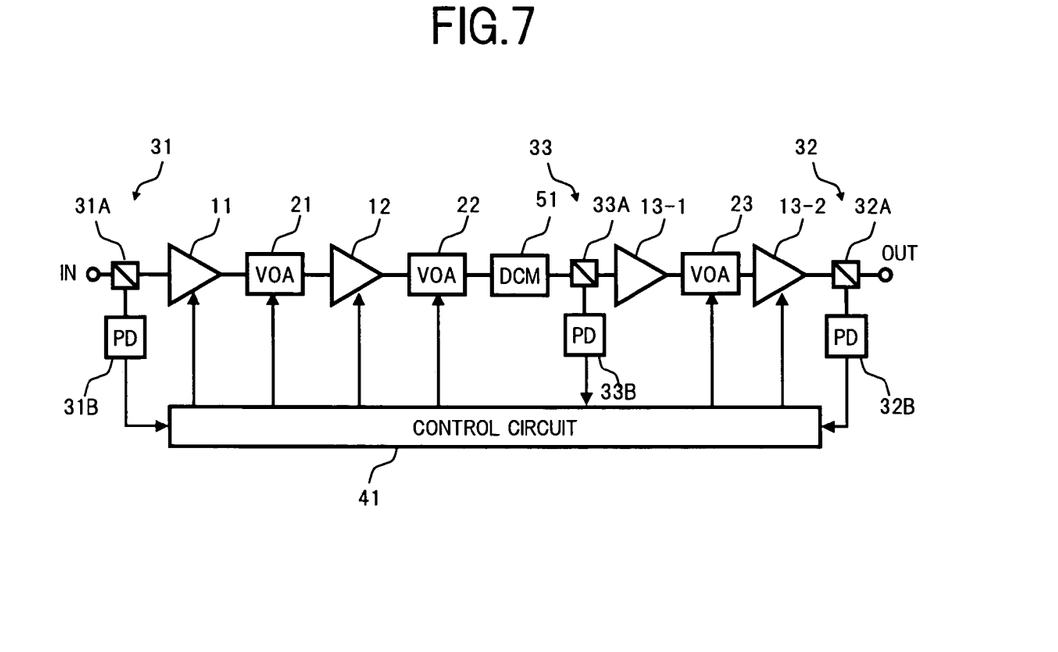
FIG. 7 is a block diagram showing another configuration associated with the second embodiment.
Figure 8:
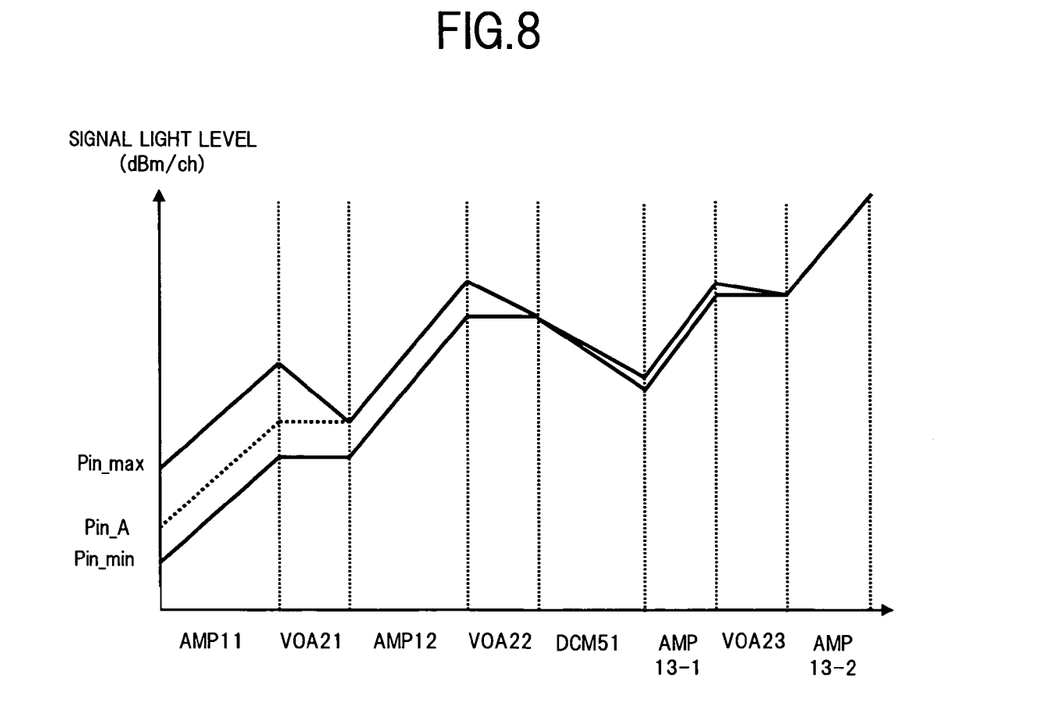
FIG. 8 is a view showing the level diagram of the signal light in the configuration of FIG. 7.

In the second embodiment, the fluctuation in loss of the chromatic dispersion compensator 51 is compensated by the output-side variable optical attenuator 22. However, for example, as shown in FIG. 7, the variable optical attenuator 23 is separately provided between the DCM output monitor unit 33 and the optical amplification unit 13-2, the attenuation amount of the variable optical attenuator 23 is controlled based on the detection result of the DCM output monitor unit 33, and part of or the whole compensation of the fluctuation in loss of the chromatic dispersion compensator 51 may be performed by the variable optical attenuator 23. FIG. 8 shows a level diagram when the compensation of the fluctuation in loss of the chromatic dispersion compensator 51 is performed by the variable optical attenuator 23. The attenuation amount of the variable optical attenuator 22 is set similarly to the first embodiment, the attenuation amount of the variable optical attenuator 23 is controlled such that the fluctuation in loss of the chromatic dispersion compensator 51 is increased.

Then, a third embodiment of the invention will be described.

Figure 9:
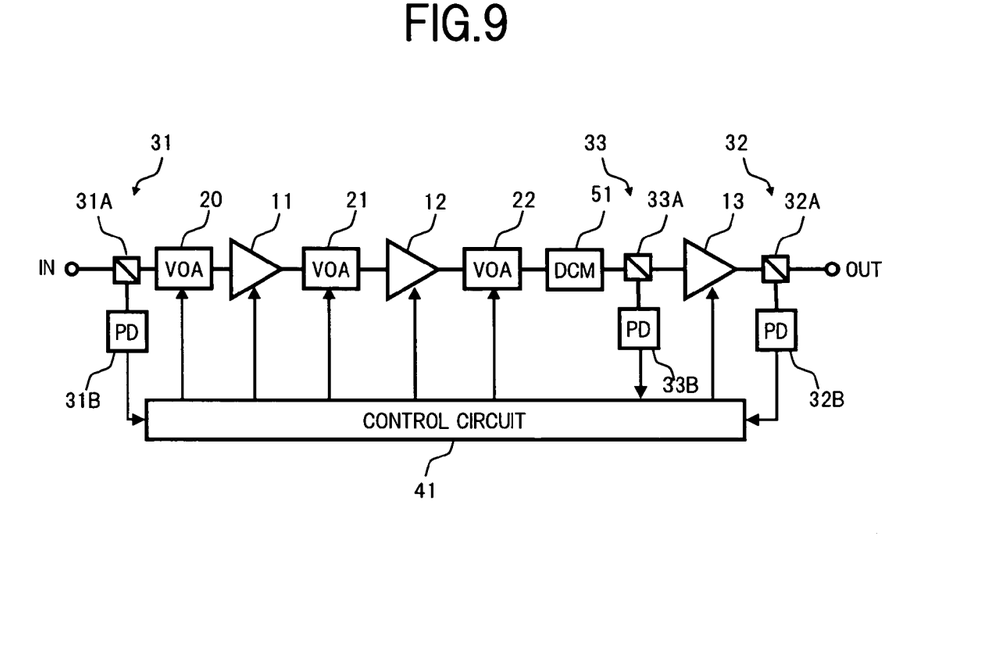
FIG. 9 is a block diagram showing a configuration of a WDM optical amplifier according to a third embodiment of the invention.

FIG. 9 is a block diagram showing a configuration of a WDM optical amplifier according to the third embodiment of the invention.

Referring to FIG. 9, in the WDM optical amplifier of the third embodiment, a variable optical attenuator 20 which is of the third variable optical attenuation unit is provided between the input monitor unit 31 and the fore-stage optical amplification unit 11 with respect to the second embodiment, the attenuation amount of the variable optical attenuator 20 is controlled according to the signal light input level, which further enlarges the effective input dynamic range. The configurations of other components except for the variable optical attenuator 20 are similar to the second embodiment.

In the WDM optical amplifier of the third embodiment having the above configuration, when the signal light input level exists within the effective input dynamic range of the second embodiment, the attenuation amount of the variable optical attenuator 20 is set to the minimum (desirably to zero), and the variable optical attenuators 21 and 22 are controlled according to the signal light input level like the second embodiment. When the signal light input level exceeds the upper limit level of the input dynamic range, the attenuation amount of the variable optical attenuator 20 is increased to perform the control in which the signal light level inputted to the fore-stage optical amplification unit 11 is kept constant.

Figure 10:
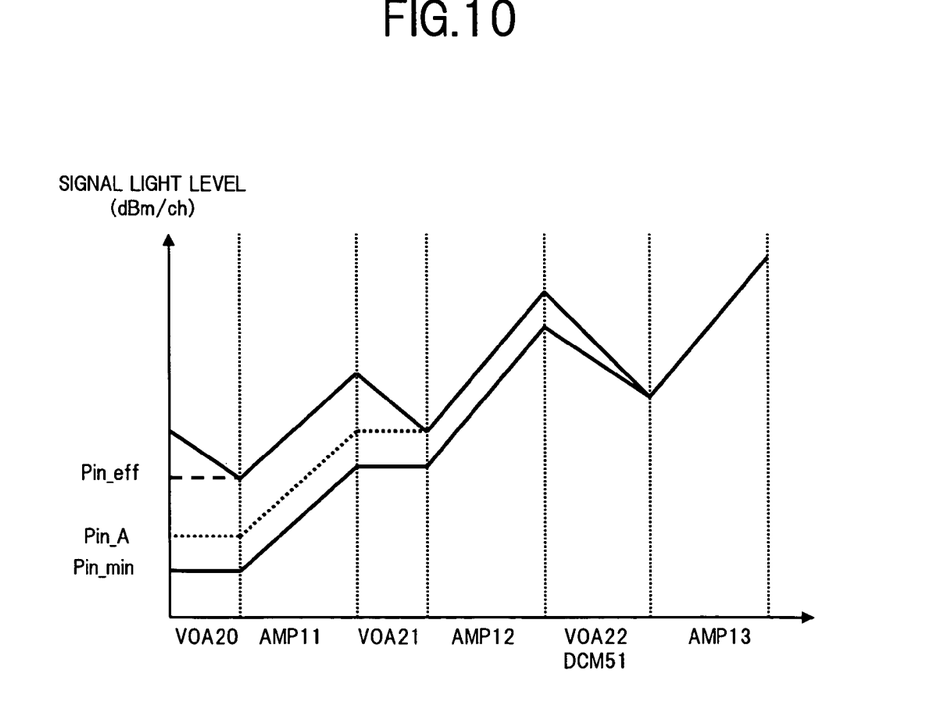
FIG. 10 is a view showing the level diagram of the signal light in the third embodiment.

Specifically, assuming that the upper limit level of the effective input dynamic range of the second embodiment is Pin_eff (second base point level), the increase (Pin−Pin_eff) in signal light input level Pin for the second base point level Pin_eff is computed, and the attenuation amount of the variable optical attenuator 20 is controlled to (Pin−Pin_eff). Therefore, even if the signal light input level of the WDM light inputted to the input port IN exceeds the second base point level Pin_eff, as shown in FIG. 10, the level diagram of the signal light after the fore-stage optical amplification unit 11 becomes equal to the level diagram of the second embodiment.

Figure 11:
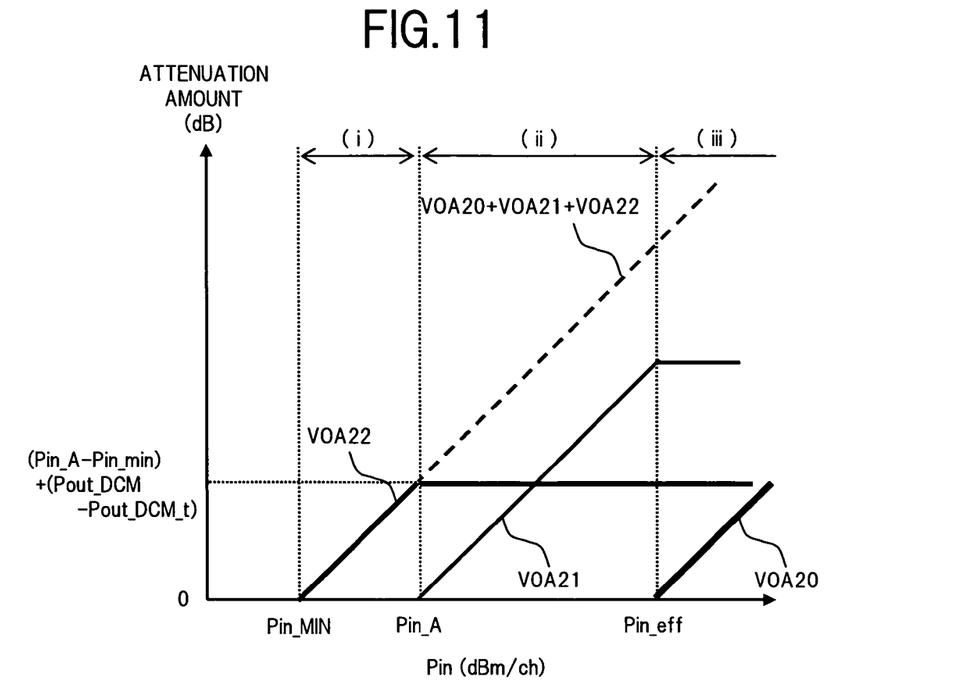
FIG. 11 is a view for explaining a control sequence of each variable optical attenuator in the third embodiment.

Accordingly, in the control sequences of the variable optical attenuators 20, 21, and 22 according to the signal light input level Pin, as shown in FIG. 11, in the case of Pin_min<Pin<Pin_A ((i) region of FIG. 11), the attenuation amounts of the variable optical attenuators 20 and 21 are not increased (namely, basically minimum), and the attenuation amount of the variable optical attenuator 22 is set at {(Pin−Pin_min)+(Pout_DCM−Pout_DCM_t)}. In the case of Pin_A<Pin<Pin_eff ((ii) region of FIG. 11), the attenuation amount of the variable optical attenuator 20 is not increased (namely, basically minimum), the attenuation amount of the variable optical attenuator 21 is set at (Pin−Pin_A), and the attenuation amount of the variable optical attenuator 22 is set at {(Pin_A–Pin_min)+(Pout_DCM–Pout_DCM_t)}. In the case of Pin>Pin_eff ((iii) region of FIG. 11), the attenuation amount of the variable optical attenuator 20 is set at (Pin–Pin_eff), the attenuation amount of the variable optical attenuator 21 is set at (Pin_eff–Pin_A), and the attenuation amount of the variable optical attenuator 22 is set at {(Pin_A–Pin_min)+(Pout_DCM–Pout_DCM_t)}.

Figure 12:
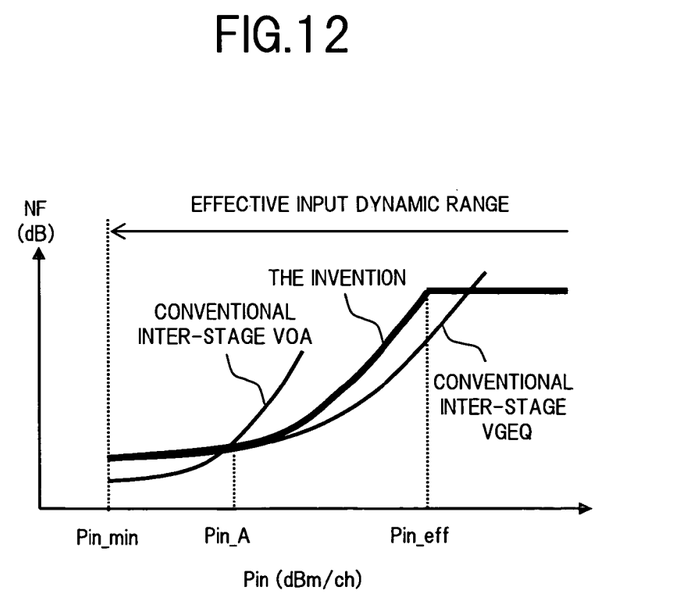
FIG. 12 is a view showing the NF change to the signal light input level in the third embodiment.

The WDM light is amplified while the attenuation amounts of the variable optical attenuators 20, 21, and 22 are controlled according to the signal light input level Pin as described above, which obtains the characteristics shown in FIG. 12 with respect to NF of the WDM optical amplifier. As can be seen from FIG. 12, in the region where the signal light input level is low, because the variable optical attenuator 20 is arranged in front of the fore-stage optical amplification unit 11, NF is slightly degraded as compared with the conventional inter-stage VOA. However, the steep degradation of NF is avoided unlike the conventional inter-stage VOA in the region where the signal light input level is high. Further, in the region where the signal light input level exceeds Pin_eff, because the signal light input level to the fore-stage optical amplification unit 11 is kept constant by the variable optical attenuator 20, NF is kept constant even if the signal light input level is increased.

Thus, according to the WDM optical amplifier of the third embodiment, in addition to the same effect as the second embodiment, the effective input dynamic range in which Pin_eff becomes the upper limit in the second embodiment can further be enlarged.

In the above first to third embodiments, for the input monitor unit 31, the WDM light is branched by the optical branching coupler 31A, and the total power of a part of the WDM light is monitored by the photodetector 31B. However, sometimes it is assumed that WDM light input level is difficult to be monitored by the photodetector 31B in association with the widening of the effective input dynamic range. In such a case, for example, the light branched by the optical branching coupler 31A is further branched by another optical branching coupler, the basically different input level ranges are received by plural photodetectors, and the photodetectors are used by switching the outputs of the photodetectors according to the WDM light input level. Therefore, the input monitor, which covers the wide input dynamic range, can be realized.

What is claimed is:

1. An optical amplifier comprising:
   an input port and an output port;
   a first optical amplification unit configured to amplify a wavelength division multiplexing light inputted to said input port;
   a first optical attenuation unit configured to attenuate the wavelength division multiplexing light amplified by said first optical amplification unit;
   a second optical amplification unit configured to amplify the wavelength division multiplexing light attenuated by said first optical attenuation unit, and outputs the wavelength division multiplexing light to said output port;
   an input monitor unit configured to detect power of the wavelength division multiplexing light inputted to said input port;
   an output monitor unit configured to detect the power of the wavelength division multiplexing light outputted from said output port; and
   a control unit configured to control said first and second optical amplification units based on the detection results of said input monitor unit and said output monitor unit such that a gain of each optical amplification unit is kept constant, and configured to control an attenuation amount of said first optical attenuation unit such that the signal light level per one wavelength outputted from said output port is kept constant, even if the signal light level per one wavelength of the wavelength division multiplexing light inputted to said input port is changed,
   wherein the optical amplifier includes a second optical attenuation unit which is provided between said second optical amplification unit and said output port, and
   when a signal light input level per one wavelength computed based on the detection result of said input monitor unit is lower than a predetermined first base point level, said control unit is configured to minimize the attenuation amount of said first optical attenuation unit and said control unit is configured to control the attenuation amount of said second optical attenuation unit according to said signal light input level, when said signal light input level is higher than said first base point level, said control unit is configured to control the attenuation amounts of both said first and second optical attenuation unit according to said signal light input level,
   wherein said first base point level is higher than a lower limit level of an effective input dynamic range, and said first base point level is lower than an intermediate level of said input dynamic range.

2. An optical amplifier according to claim 1,
   wherein, when said signal light input level is lower than said first base point level, said control unit is configured to set the attenuation amount of said second optical attenuation unit at a value corresponding to the increase in signal light input level for a lower limit level of said input dynamic range, when said signal light input level is higher than said first base point level, said control unit is configured to set the attenuation amount of said first optical attenuation unit at a value corresponding to the increase in signal light input level for said first base point level and said control unit is configured to set the attenuation amount of said second optical attenuation unit at a value corresponding to a difference between the lower limit level of said input dynamic range and said first base point level.

3. An optical amplifier according to claim 1, comprising:
   a chromatic dispersion compensation unit which is provided between said second optical attenuation unit and said output port,
   wherein said control unit controls the attenuation amount of said second optical attenuation unit such that a signal light level per one wavelength of the wavelength division does not disclose or make obvious, chromatic dispersion compensation unit becomes a predetermined target level.

4. An optical amplifier according to claim 3, comprising:
   a third optical amplification unit which amplifies the wavelength division multiplexing light outputted from said chromatic dispersion compensation unit, and outputs the wavelength division multiplexing light to said output port.

5. An optical amplifier according to claim 1, comprising: a chromatic dispersion compensation unit which is provided between said second optical attenuation unit and said output port; and a variable optical attenuation unit which attenuates the wavelength division multiplexing light outputted from said chromatic dispersion compensation unit, a chromatic-dispersion-compensation variable optical attenuation unit which attenuates the wavelength division multiplexing light outputted from said chromatic dispersion compensation unit,
   wherein said control unit controls the attenuation amounts of said first and second optical attenuation units such that the signal light level per one wavelength of the wavelength division multiplexing light inputted to said chromatic dispersion compensation unit is kept constant, and said control unit controls the attenuation amount of said chromatic-dispersion-compensation variable optical attenuation unit such that the signal light level per one wavelength of the wavelength division multiplexing light outputted from said chromatic-dispersion-compensation variable optical attenuation unit is kept constant.

6. An optical amplifier according to claim 5, comprising:
a third optical amplification unit which amplifies the wavelength division multiplexing light attenuated by said chromatic-dispersion-compensation variable optical attenuation unit, and outputs the wavelength division multiplexing light to said output port.

7. An optical amplifier according to claim 1,
   wherein a third optical attenuation unit is provided between said input port and said first optical amplification unit, and
   when the signal light input level per one wavelength computed based on the detection result of said input monitor unit is lower than a predetermined second base point level, said control unit minimizes the attenuation amount of said third optical attenuation unit, when said signal light input level is higher than said base point level, said control unit sets the attenuation amount of said third optical attenuation unit at a value corresponding to an increase in signal light input level for said second base point level.

8. An optical amplifier according to claim 7,
   wherein said second base point level is set corresponding to an upper limit level of the effective input dynamic range when said third optical attenuation unit is not provided.

* * * * *

UNITED STATES PATENT AND TRADEMARK OFFICE
CERTIFICATE OF CORRECTION

PATENT NO. : 7,453,628 B2  Page 1 of 1
APPLICATION NO. : 11/322558
DATED : November 18, 2008
INVENTOR(S) : Miki Onaka and Yasushi Sugaya It is certified that error appears in the above-identified patent and that said Letters Patent is hereby corrected as shown below:

On the title page, the title of the invention should be changed to "Optical Amplifier Having Wide Input Dynamic Range."

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,453,628 B2 | Page 1 of 1 |
| APPLICATION NO. | : 11/322558 | |
| DATED | : November 18, 2008 | |
| INVENTOR(S) | : Miki Onaka and Yasushi Sugaya | |

It is certified that error appears in the above-identified patent and that said Letters Patent is hereby corrected as shown below:

On the title page, Item [54] and Column 1, lines 1 and 2, the title of the invention should be changed to "Optical Amplifier Having Wide Input Dynamic Range."

This certificate supersedes the Certificate of Correction issued March 17, 2009.

Signed and Sealed this

Seventh Day of April, 2009

JOHN DOLL
*Acting Director of the United States Patent and Trademark Office*